No. 617,603. Patented Jan. 10, 1899.
J. A. REED.
VELOCIPEDE DRIVING GEAR.
(Application filed Jan. 12, 1898.)
(No Model.)
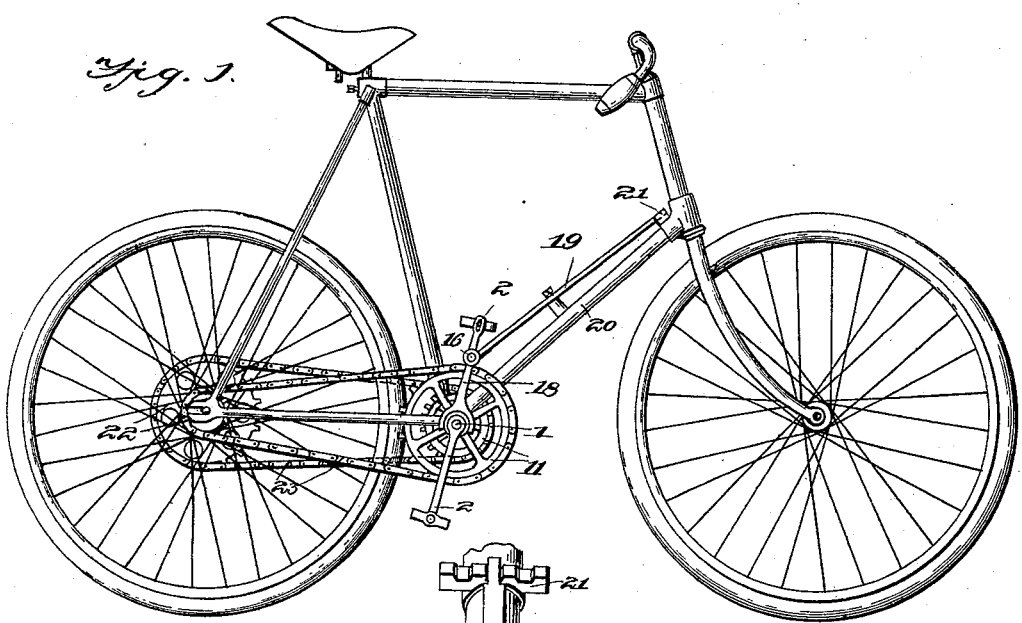
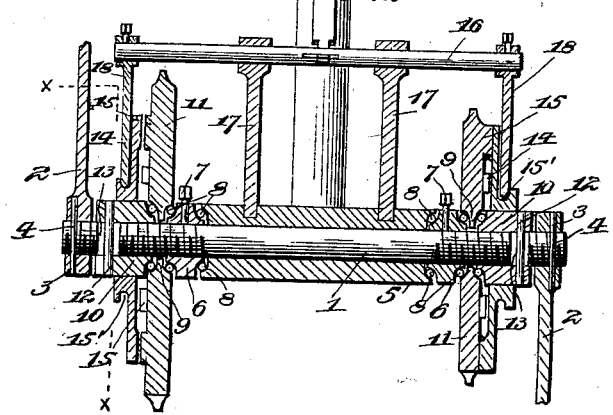
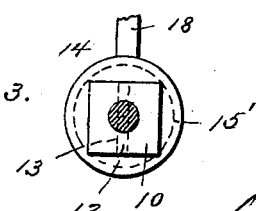
Witnesses
Inventor
John A. Reed,
by V. S. Stockbridge
his Attorney
THE NORRIS PETERS CO., PHOTO-LITHO., WASHINGTON, D. C.

UNITED STATES PATENT OFFICE.

JOHN A. REED, OF MORVIN, ALABAMA.

VELOCIPEDE DRIVING-GEAR.

SPECIFICATION forming part of Letters Patent No. 617,603, dated January 10, 1899.

Application filed January 12, 1898. Serial No. 666,448. (No model.)

*To all whom it may concern:*

Be it known that I, JOHN A. REED, a citizen of the United States, residing at Morvin, in the county of Clarke and State of Alabama, have invented certain new and useful Improvements in Velocipede Driving-Gears; and I do hereby declare the following to be a full, clear, and exact description of the invention, such as will enable others skilled in the art to which it appertains to make and use the same.

This invention has reference to a novel construction in driving-gear for velocipedes, and has for its object to provide an interchangeable gearing whereby the rider can without dismounting and while he is riding change the size of the gear to high or low quickly and without inconvenience.

The invention consists in the features of construction hereinafter described and specifically claimed.

In the accompanying drawings, forming part of this specification, Figure 1 is a side elevation of a bicycle constructed in accordance with this invention. Fig. 2 is a vertical section taken through the pedal-shaft. Fig. 3 is a detail section on the line $x\ x$ of Fig. 2.

Referring now to said drawings, 1 indicates the pedal-shaft, which is conveniently screw-threaded and provided at its ends with the pedals 2, conveniently held thereon by said screw-threads in connection with a key 3, extending through the end of the crank-arm and through a slot 4 in the end of shaft 1. The ends of the crank-hanger 5 are prepared to act as one of the members for the roller-bearing in connection with the sleeve 6, that is screwed upon the shaft 1 and held in place by a set-screw 7. One of these sleeves is situated at each end of the crank-hanger to receive between them and the crank-hanger the balls 8. The outer ends of the sleeve 6 are also arranged to act in connection with the cone-hub 9 of the driving-sprocket, another cone-sleeve 10 being situated on the outside of said driving-sprocket 9. A sprocket 11 is arranged at each end of the shaft and is held thereon by the said cone-sleeve 10, said sleeve screwing upon the shaft and held in this adjustable position by means of the key 12, which passes through the cone-sleeve and enters a notch 13 in said shaft, it being noted that said keyway or notch 13 is extended to permit of the necessary threaded adjustment of the sleeve 10. The cone-sleeve 10 is adjusted by turning it on the shaft, and when adjusted is held from turning by the key 12 engaging the notch 13. The rear end portion of the sleeve 10 is squared to receive a clutch member 14, that acts in connection with the clutch-teeth 15 on the outer side of the sprocket-wheel 11, it being noted that said sprocket-wheel forms the other member of the clutch. The clutch member 14 is also provided near its outer end with an annular groove 15', and said clutch members 14 are free to slide upon the squared portion of the sleeve 10 and are moved by means of a transverse sliding rod 16, mounted in guides 17, extending upwardly from the crank-hanger and which are provided at their ends with the bifurcated arms 18, that enter the annular grooves in the clutch member 14. An operating-lever 19 is pivoted on the lower frame 20 of the velocipede-frame and is connected with the transverse bar 16, preferably by having its reduced rear end inserted within the slot of said bar. The front end of the operating-lever 19 rests upon a securing-plate 21, it being noted that the forward end of the operating-lever 19 acts as a spring, so that it snaps into the notches in said securing-plate.

The driving-wheel of the velocipede is provided on each side with a sprocket-pinion 22, and two sprocket-chains 23 are trained around the driving-sprockets 11 on the pedal-shaft and the said sprocket-pinions 22, it being noted that said driving-sprockets vary in size, so as to give a high or low gear to the driving mechanism.

In operation it is seen that when the operating-lever 19 is drawn to either side it has the effect of throwing one clutch member 14 into engagement with the sprocket-wheel 11 and removing the other, whereby the gearing of the driving mechanism is changed, as is obvious.

Having thus described my invention, what I claim as new, and desire to secure by Letters Patent, is—

The combination with the pedal-shaft, screw-threaded and provided with an elongated keyway near each end thereof, of sprocket-wheels rotatable upon said pedal-shaft, cone-sleeves situated on the outside of said gear-wheels and each having a squared outer end portion, keys passing through said cone-sleeves and the keyways of the shaft, clutch members mounted to slide upon said squared portion of the sleeves and coacting with clutch-faces upon said driving-gears, and means for moving said clutch members in unison.

In testimony whereof I affix my signature in presence of two witnesses.

JOHN A. REED.

Witnesses:
J. H. REED,
W. A. WAKEMAN.